United States Patent
Neuenschwander et al.

(10) Patent No.: US 11,816,694 B2
(45) Date of Patent: Nov. 14, 2023

(54) TECHNIQUES FOR MANAGING ADVERTISEMENT ATTRIBUTIONS WHILE PRESERVING USER PRIVACY

(71) Applicant: Apple Inc., Cupertino, CA (US)

(72) Inventors: Erik C. Neuenschwander, San Mateo, CA (US); Jason A. Novak, Chicago, IL (US); Joseph A. Tyson, Redwood City, CA (US); Dana J. Dubois, San Francisco, CA (US); Jakob D. Swank, Gilroy, CA (US); Darren M. Lew, Los Altos, CA (US); Dmitriy Y. Filyushin, Santa Cruz, CA (US); Katherine B. Skinner, San Francisco, CA (US); Ross F. LeBeau, South San Francisco, CA (US); Payam Mirrashidi, Los Altos, CA (US); Guy L. Tribble, Hillsborough, CA (US); Jeffrey L. Robbin, Los Altos, CA (US); Sam H. Gharabally, San Carlos, CA (US)

(73) Assignee: Apple Inc., Cupertino, CA (US)

( * ) Notice: Subject to any disclaimer, the term of this patent is extended or adjusted under 35 U.S.C. 154(b) by 250 days.

(21) Appl. No.: 16/146,796

(22) Filed: Sep. 28, 2018

(65) Prior Publication Data
US 2019/0266631 A1 Aug. 29, 2019

Related U.S. Application Data

(60) Provisional application No. 62/636,820, filed on Feb. 28, 2018.

(51) Int. Cl.
*G06Q 30/02* (2023.01)
*G06Q 30/0242* (2023.01)
*H04L 9/40* (2022.01)

(52) U.S. Cl.
CPC ..... *G06Q 30/0243* (2013.01); *H04L 63/0428* (2013.01)

(58) Field of Classification Search
CPC ............ G06Q 30/0243; H04L 63/0428; H04L 63/0421; H04L 63/123
See application file for complete search history.

(56) References Cited

U.S. PATENT DOCUMENTS

| | | | |
|---|---|---|---|
| 8,838,784 B1 * | 9/2014 | Kalavade | H04L 67/22 709/224 |
| 10,460,098 B1 * | 10/2019 | Wang | G06F 21/44 |

(Continued)

OTHER PUBLICATIONS

"App Store", Aug. 24, 2017, Wikipedia: https://en.wikipedia.org/w/index.php?title=App_store&oldid=796995661, pp. 1-6 (Year: 2017).*

*Primary Examiner* — John Van Bramer
(74) *Attorney, Agent, or Firm* — DICKINSON WRIGHT RLLP

(57) ABSTRACT

The embodiments set forth techniques for managing advertisement attributions. A first technique can be implemented by an "app store" application, and include the steps of (1) receiving, from a first user application, a request to view a second user application, where the request includes a set of digitally-signed parameters that are specific to an advertising campaign (provided by an advertisement network) for the second user application that is presented by the first user application. In turn, and in response to identifying that the second user application satisfies at least one criterion, the app store application provides the set of digitally-signed parameters to an advertisement metrics manager that: (i) verifies the set of digitally-signed parameters, and (ii) indicates, to the advertisement network, that business logic should be carried out in association with the first user (Continued)

application and the second user application. A second technique for managing advertisement attributions is also disclosed.

20 Claims, 9 Drawing Sheets

(56) References Cited

U.S. PATENT DOCUMENTS

| | | | | | |
|---|---|---|---|---|---|
| 2011/0321167 | A1* | 12/2011 | Wu | .................... | G06Q 30/0241 |
| | | | | | 726/26 |
| 2015/0186913 | A1* | 7/2015 | Mann | ................. | G06Q 30/0219 |
| | | | | | 705/14.21 |
| 2015/0262223 | A1* | 9/2015 | Brown | ............... | G06Q 30/0246 |
| | | | | | 705/14.45 |
| 2015/0287103 | A1* | 10/2015 | Gupta | ................ | G06Q 30/0277 |
| | | | | | 705/14.73 |
| 2017/0300969 | A1* | 10/2017 | Malhotra | ................. | G06F 3/14 |

* cited by examiner

TECHNIQUES FOR MANAGING ADVERTISEMENT ATTRIBUTIONS WHILE PRESERVING USER PRIVACY

CROSS-REFERENCE TO RELATED APPLICATIONS

The present application claims the benefit of U.S. Provisional Application No. 62/636,820, entitled "TECHNIQUES FOR MANAGING ADVERTISEMENT ATTRIBUTIONS WHILE PRESERVING USER PRIVACY," filed Feb. 28, 2018, the content of which is incorporated herein by reference in its entirety for all purposes.

FIELD

The described embodiments relate generally to managing advertisements within software applications. More particularly, the described embodiments relate to managing attributions of actions taken in response to advertisements while preserving user privacy.

BACKGROUND

It is common for software developers to incorporate electronic advertisements into their software applications. For example, in many cases, developers can offer their software applications for free, and rely instead on revenue being generated by advertisements that are displayed within their software applications. One common approach for incorporating advertisements into a given software application involves the software developer including code segments that cause the software application to (1) obtain advertisements from an advertiser via an advertising network, and (2) display the advertisements within a primary user interface (UI) of the software application. In this context, when users take an action in response to the advertisements, the advertiser can identify that the software developer should receive some form of payment. It is noted that an attribution of a user's action in response to an advertisement is referred to herein as an "advertisement attribution."

Unfortunately, conventional approaches for managing advertisements within software applications are prone to privacy issues that have yet to be mitigated. For example, in the above-described scenarios, sensitive information associated with a user—e.g., the advertising identifier of the device, which uniquely identifies the user, or the internet protocol (IP) associated with a device being utilized by a user—can be exposed to the advertiser, which is undesirable for myriad reasons. One attempt to curb this issue involves heavily masking the information that is provided by the software applications to the advertisers when users engage with the advertisements. However, such masking correspondingly decreases the accuracy by which the advertiser is able to identify the overall efficacy of advertising campaigns, which is undesirable.

Accordingly, what is needed is an enhanced technique for effectively identifying advertisement attributions within advertisement networks while preserving user privacy.

SUMMARY

Representative embodiments set forth herein disclose various techniques for managing advertisement attributions within advertisement networks while preserving user privacy.

According to some embodiments, a method for managing advertisement attributions associated with software applications is disclosed. In particular, the method can be implemented by an "app store" application executing on a computing device, and can include the steps of (1) receiving, from a first user application executing on the computing device, a request to view a second user application managed by the app store application, wherein: (i) the request includes a set of digitally-signed parameters provided by an advertisement network that is associated with the first user application, and (ii) the set of digitally-signed parameters is specific to an advertising campaign for the second user application that is presented by the first user application. The method can further include the steps of (2) storing the set of digitally-signed parameters into a cache, and (3) identifying that an activity associated with the second user application on the computing device satisfies at least one criterion. In turn, the method can further include the step of (4) providing the set of digitally-signed parameters to an advertisement metrics manager that: (i) verifies the set of digitally-signed parameters, and (ii) indicates, to the advertisement network, that business logic should be carried out in association with the first user application and the second user application.

According to some embodiments, another method for managing advertisement attributes associated with software applications is disclosed. In particular, the method can also be implemented by the app store application executing on the computing device, and can include the steps of (1) receiving, from a first user application executing on the computing device, a request to view a second user application managed by the app store application, wherein: (i) the request includes a set of digitally-signed parameters provided by an advertisement network that is associated with the first user application, and (ii) the set of digitally-signed parameters is specific to an advertising campaign for the second user application that is presented by the first user application. The method can further include the steps of (2) providing the set of digitally-signed parameters to an advertisement metrics manager, (3) receiving, from the advertisement metrics manager, an updated set of digitally-signed parameters, and (4) storing the updated set of digitally-signed parameters into a cache. Additionally, the method can include the steps of (5) identifying that an activity associated with the second user application on the computing device satisfies at least one criterion, and (6) providing the updated set of digitally-signed parameters to the advertisement network to indicate that business logic should be carried out in association with the first user application and the second user application.

Other embodiments include a non-transitory computer readable storage medium configured to store instructions that, when executed by a processor included in a computing device, cause the computing device to carry out the various steps of any of the foregoing methods. Further embodiments include a computing device that is configured to carry out the various steps of any of the foregoing methods.

Other aspects and advantages of the invention will become apparent from the following detailed description taken in conjunction with the accompanying drawings that illustrate, by way of example, the principles of the described embodiments.

BRIEF DESCRIPTION OF THE DRAWINGS

The disclosure will be readily understood by the following detailed description in conjunction with the accompanying drawings, wherein like reference numerals designate like structural elements.

DETAILED DESCRIPTION

Representative applications of methods and apparatus according to the present application are described in this section. These examples are being provided solely to add context and aid in the understanding of the described embodiments. It will thus be apparent to one skilled in the art that the described embodiments may be practiced without some or all of these specific details. In other instances, well known process steps have not been described in detail in order to avoid unnecessarily obscuring the described embodiments. Other applications are possible, such that the following examples should not be taken as limiting.

In the following detailed description, references are made to the accompanying drawings, which form a part of the description and in which are shown, by way of illustration, specific embodiments in accordance with the described embodiments. Although these embodiments are described in sufficient detail to enable one skilled in the art to practice the described embodiments, it is understood that these examples are not limiting; such that other embodiments may be used, and changes may be made without departing from the spirit and scope of the described embodiments.

Figure 1:
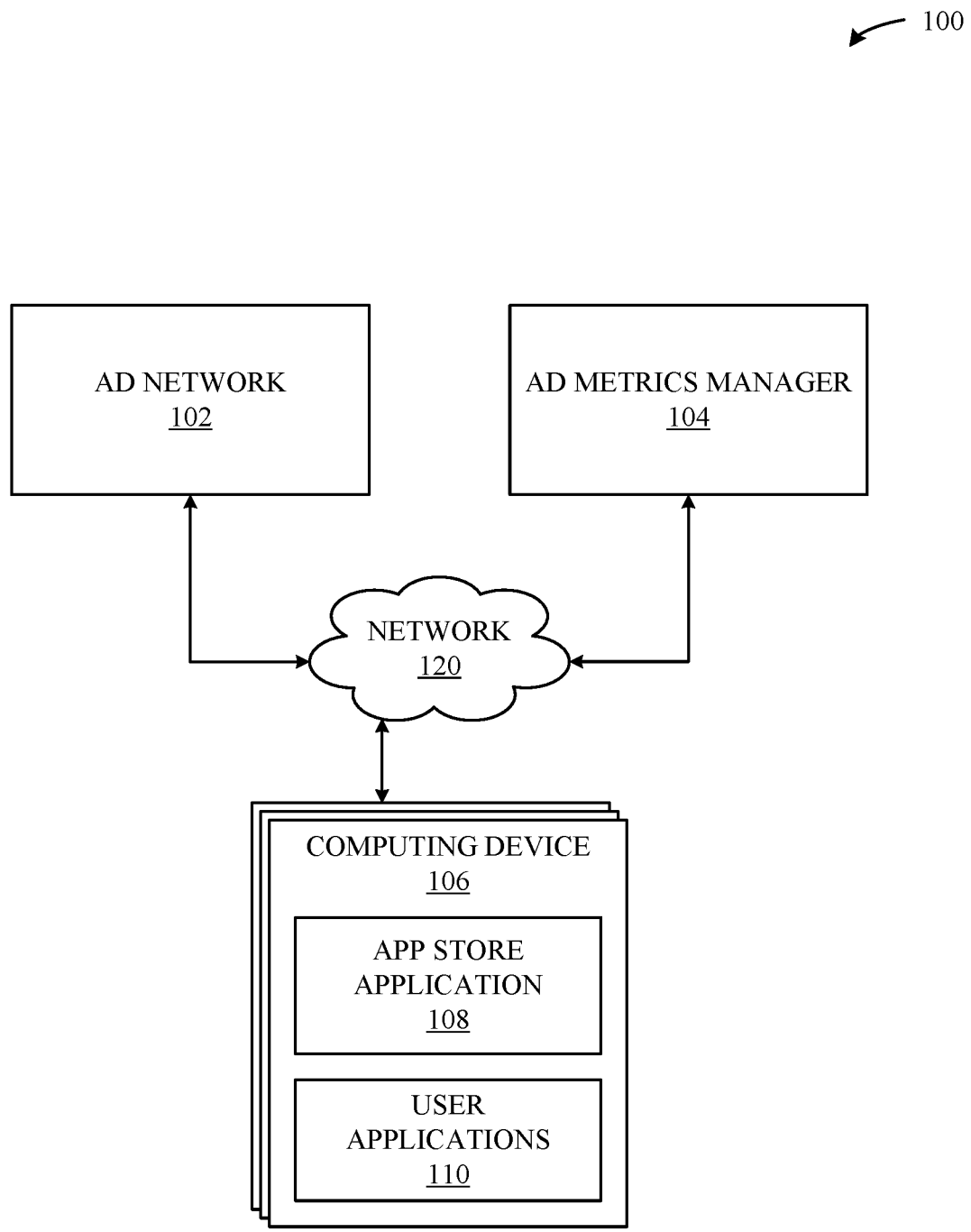
FIG. 1 illustrates a system diagram of computing devices that can be configured to perform the various techniques described herein, according to some embodiments.

FIG. 1 illustrates a block diagram 100 of different computing devices that can be configured to implement the various techniques described herein, according to some embodiments. More specifically, FIG. 1 illustrates a high-level overview of an advertisement network 102, an advertisement metrics manager 104, and computing devices 106, which can each be configured to communicate with one another via a network 120 (e.g., the Internet). Although not illustrated in FIG. 1, it should be understood that the advertisement network 102 can represent a collection of computing devices (e.g., servers) that are configured to implement the various functionalities of the advertisement network 102 set forth herein. It should also be understood that the advertisement metrics manager 104 can represent a collection of computing devices (e.g., servers) that are configured to implement the various functionalities of the advertisement metrics manager 104 set forth herein.

Although not illustrated in FIG. 1, it should be understood that the various computing devices described herein—e.g., the servers associated with the advertisement network 102, the servers associated with the advertisement metrics manager 104, the computing devices 106, etc.—can include at least one processor, at least one memory, and at least one storage device. As is well-known, for a given computing device, the at least one processor can be configured to work in conjunction with the at least one memory and the at least one storage device to enable the computing device to operate in accordance with its intended functionality set forth this disclosure. In particular, the at least one processor can be configured to load an operating system (OS) from the at least one storage device into the at least one memory for execution. In turn, the OS can load different applications that enable the various techniques set forth herein to be implemented. For example, as illustrated in FIG. 1, each computing device 106 can be configured to execute an app store application 108 that enables one or more user applications 110 to be installed on the computing device 106. Additionally, it should be understood that the OS can be configured to enable a variety of processes to execute on the computing device 106, e.g., hardware drivers, OS daemons, and the like. It should additionally be understood that the various techniques set forth herein can be implemented by additional entities, computing devices, etc., not illustrated in FIG. 1. For example, the different functionalities implemented by the advertisement network 102, the advertisement metrics manager 104, and the computing devices 106 can be off-loaded onto additional computing devices—or combined into fewer computing devices—without departing from the scope of this disclosure.

According to some embodiments, and as described in greater detail below, the advertisement network 102, the advertisement metrics manager 104, and at least one computing device 106 can work in concert to implement a first approach for implementing advertisement attribution techniques, which is described below in greater detail in conjunction with FIGS. 2A-2C. Additionally, and as described in greater detail below, the advertisement network 102, the advertisement metrics manager 104, and at least one computing device 106 can work in concert to implement a second approach for implementing advertisement attribution techniques, which is described below in greater detail in conjunction with FIGS. 3A-3D.

Accordingly, FIG. 1 sets forth a high-level overview of the manner in which the various computing devices illustrated in FIG. 1 can be configured to implement the various techniques described herein. A more detailed breakdown of the first and second approaches for implementing advertisement attribution techniques will now be provided below in conjunction with FIGS. 2A-2C and 3A-3D, respectively.

Figure 2A:
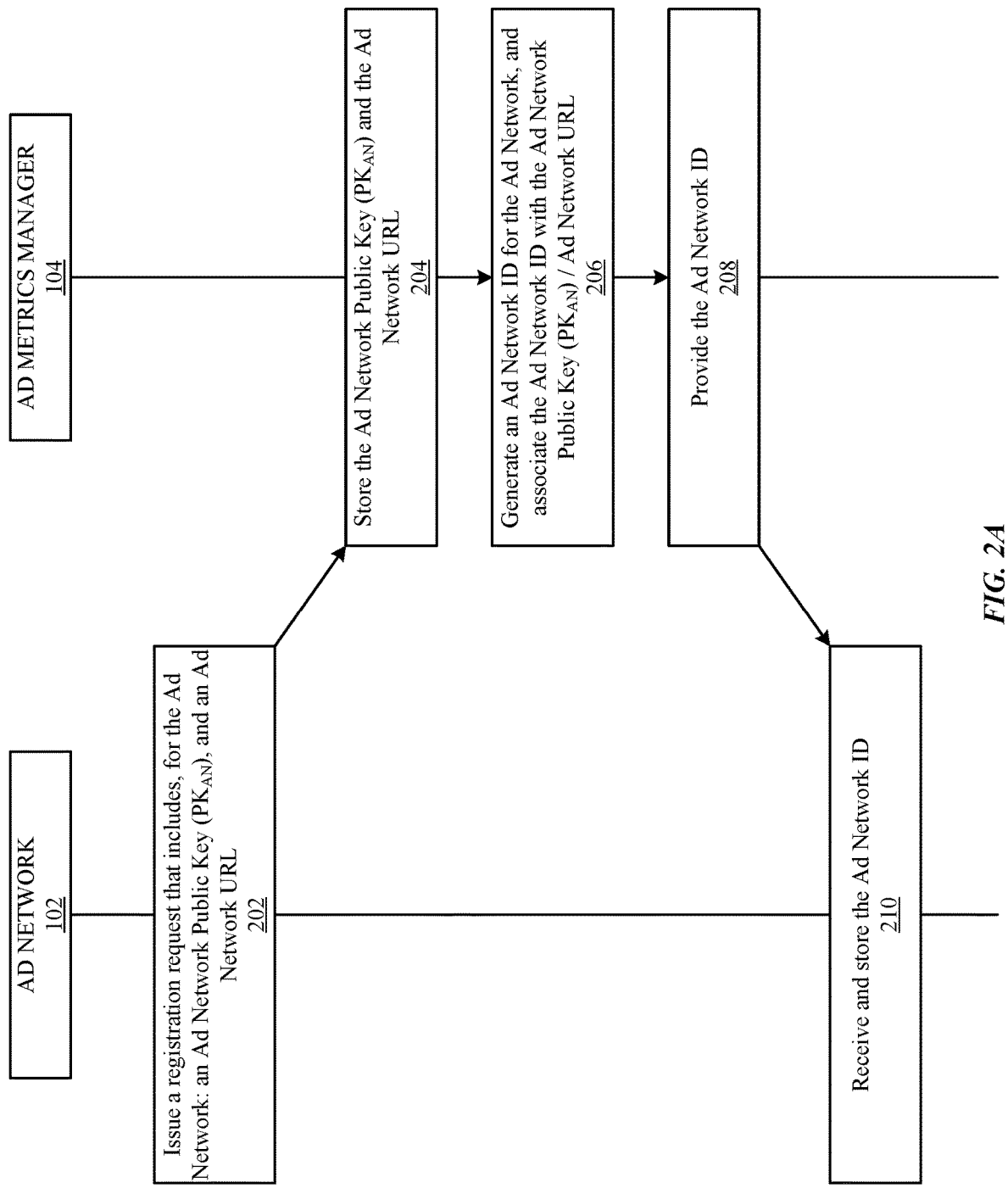
FIGS. 2A-2C illustrate a method for a first approach for implementing the advertisement attribution techniques set forth herein, according to some embodiments.
Figure 2B:
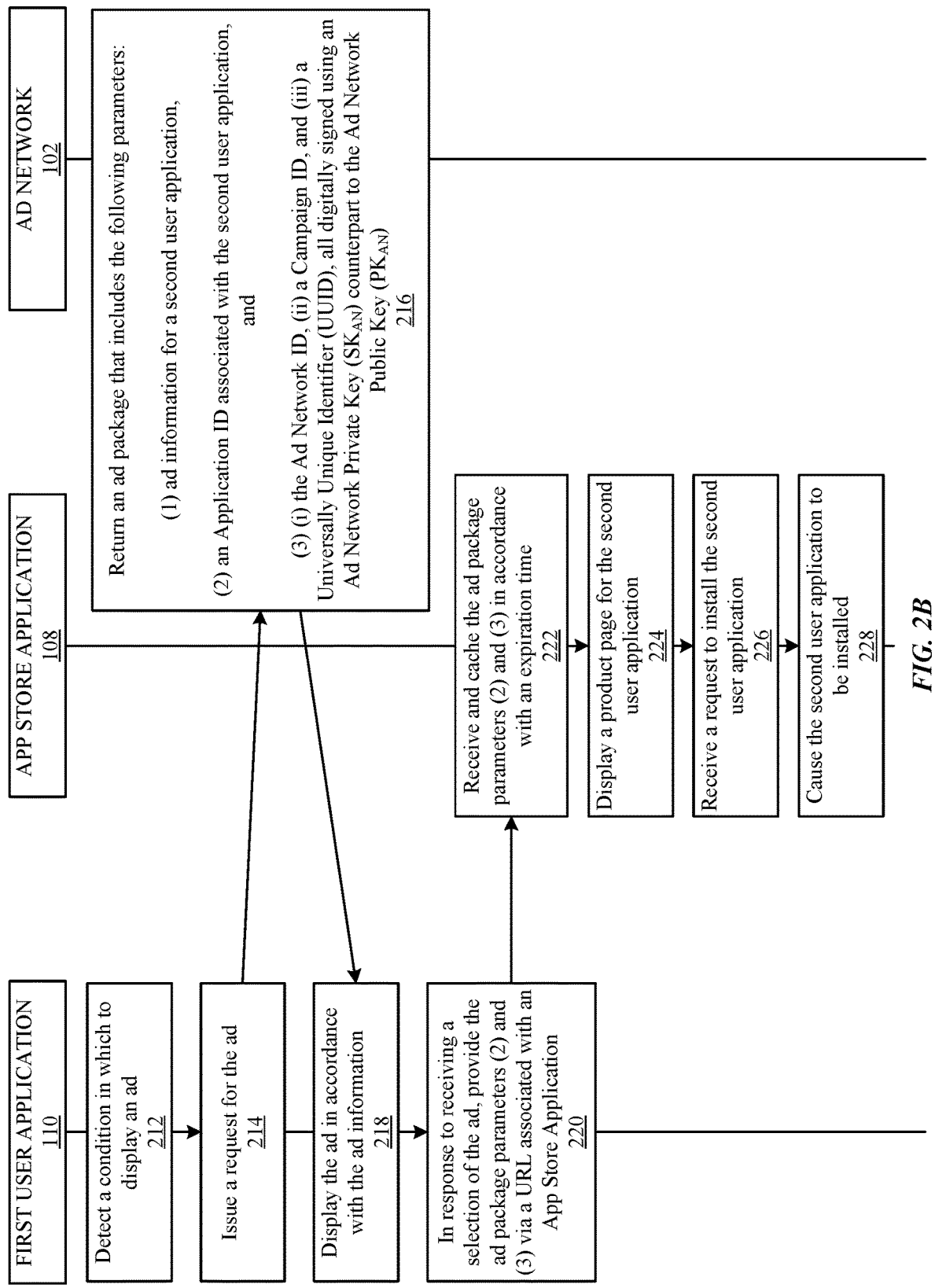
Figure 2C:
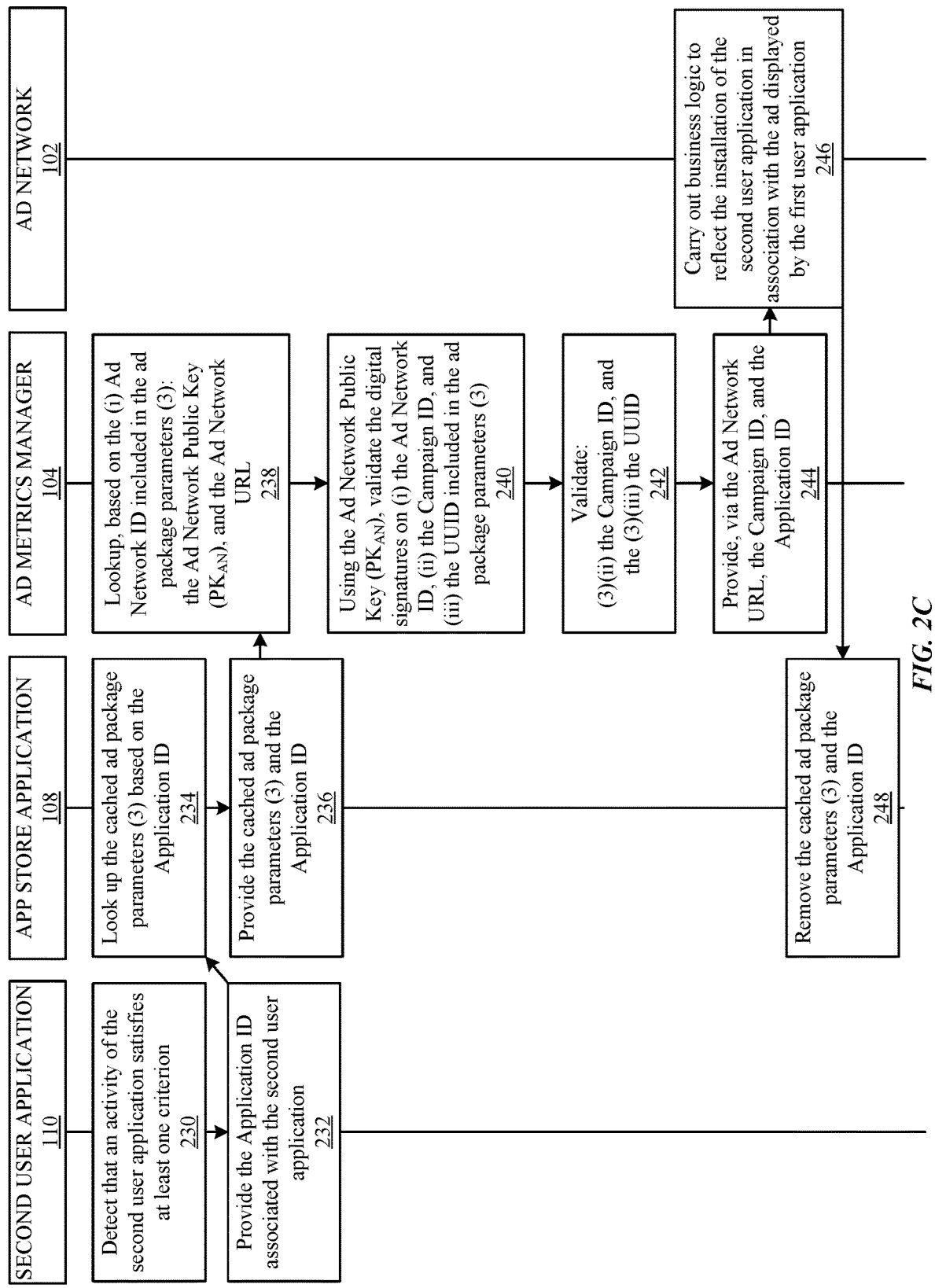

FIGS. 2A-2C illustrate a method for a first approach for implementing the advertisement attribution techniques set forth herein, according to some embodiments. In particular, FIG. 2A depicts a first process—referred to herein as a "registration process"—that can take place between the advertisement network 102 and the advertisement metrics manager 104. In one example, the advertisement network 102 can issue the request when the advertisement network 102 is affiliated with at least one user application 110 managed by (e.g., for sale/distribution within) the app store application 108. In particular, when the advertisement network 102 plans on serving advertisements for a second user application 110 within a first user application 110, the registration process can enable the advertisement network 102 to receive reliable indications of when the advertisements cause users to install the second user application 110. It is noted that the registration process depicted in FIG. 2A can take place between the advertisement network 102 and the advertisement metrics manager 104 at any time, and any number of times, without departing from the scope of this disclosure.

As shown in FIG. 2A, the registration process begins at step 202, where the advertisement network 102 issues—to the advertisement metrics manager 104—a registration request. In particular, the registration request can include, for the advertisement network 102: an advertisement network public key ($PK_{AN}$), and an advertisement network Uniform Resource Locator (URL). According to some embodiments, the advertisement network 102 can manage both the advertisement network public key ($PK_{AN}$) and a counterpart advertisement network private key ($SK_{AN}$) in accordance with asymmetrical cryptographic approaches. For example, the advertisement network public key ($PK_{AN}$) can be freely distributed, while the advertisement network private key ($SK_{AN}$) is to be retained only by the advertisement network 102. According to some embodiments, the advertisement network URL can point to any resource (e.g., one or more servers) associated with the advertisement network 102 that enables the advertisement network 102 to receive information. In particular, this information can be associated with activities that take place on computing devices 106 in relation to advertisements that are distributed by the advertisement network 102 and displayed by user applications 110 executing on the computing devices 106.

At step 204, the advertisement metrics manager 104 receives the registration request from the advertisement network 102, and, in turn, the advertisement metrics manager 104 stores the advertisement network public key ($PK_{AN}$) and the advertisement network URL within a storage that is accessible to the advertisement metrics manager 104. It is noted that the advertisement metrics manager 104 can store the advertisement network public key ($PK_{AN}$) and the advertisement network URL using any available approach, e.g., on local storage devices, networked storage devices, cloud storage devices, and so on.

To satisfy the registration request, the advertisement metrics manager 104, at step 206, generates an advertisement network ID that is unique to the advertisement network 102. It is noted that any known approach can be used to generate the advertisement network ID (e.g., "123456"), e.g., using random generators, incrementable/decrementable starting values, and so on. In turn, the advertisement metrics manager 104 associates the advertisement network ID with the advertisement network public key ($PK_{AN}$)/advertisement network URL. It is noted that any known approach can be used to establish the association between the advertisement network ID and the advertisement network public key ($PK_{AN}$)/advertisement network URL. For example, the advertisement metrics manager 104 can store one or more <key, value> pairs for the advertisement network 102, where the advertisement network ID is assigned as the key, and the advertisement network public key ($PK_{AN}$)/advertisement network URL are assigned as the value. In any case, at step 208, the advertisement metrics manager 104 provides the advertisement network ID back to the advertisement network 102. In turn, at step 210, the advertisement network 102 receives and stores the advertisement network ID. Thus, at the conclusion of FIG. 2A, the advertisement network 102 has completed the registration process with the advertisement metrics manager 104, and is now capable of participating in the first approach for implementing the advertisement attribution techniques set forth herein.

FIG. 2B depicts a second process—referred to herein as an "installation process"— that can take place as a result of displaying, within user applications 110, advertisements that are provided by the advertisement network 102, according to some embodiments. As shown in FIG. 2B, at step 212, a first user application 110 executing the computing device 106 detects a condition in which to display an advertisement. It is noted that any known approach can be utilized to display advertisements within the first user application 110, e.g., context-based ads, time-based ads, and so on. For example, the first user application 110 can be configured to display an advertisement shortly after the first user application 110 is launched on the computing device 106, after the first user application 110 has launched a threshold number of times, and so on. It is also noted that any type of advertisement can be displayed within the first user application 110, e.g., audio-based ads, picture-based ads, animation-based ads, video-based ads, and so on.

At step 214, the first user application 110 issues, to the advertisement network 102, a request for the advertisement. In turn, at step 216, the advertisement network 102 returns, to the first user application 110, an advertisement package that includes (1) advertisement information for a second user application 110 (that is distinct from the first user application 110). For example, the advertisement information can include screenshots/animations associated with the second user application 110, a name of the second user application 110, a price of the second user application 110, and so on. Additionally, the advertisement package can include (2) an application ID associated with the second user application 110, where the application ID can take the form of an integer (e.g., "654321"), an alphanumeric character (e.g., "APP_ID_2"), and so on. According to some embodiments, the application ID is known to the app store application 108 and is unique to the second user application 110, as the app store application 108 manages the distribution of the second user application 110. In this regard, the app store application 108 can be capable of displaying information about the second user application 110 and enabling the second user application 110 to be installed on the computing device 106. As described in greater detail below, such an installation can take place as a result of a user responding to the advertisement—also referred to herein as an "advertising campaign"—for the second user application 110 within the first user application 110 (e.g., tapping on the ad), which is described in greater detail below in conjunction with step 224.

Additionally, and as shown in FIG. 2B, the advertisement package can include (3) (i) the advertisement network ID (generated at step 206 in FIG. 2A), (ii) a campaign ID, and (iii) a universally unique identifier (UUID). According to some embodiments, the campaign ID can be utilized by the advertisement network 102 to effectively track a variety of aspects associated with advertising campaigns. For example, a particular campaign ID can be associated with the first user application 110, and can also be associated with a collection of different advertisements for the second user application 110 that are displayed within the first user application 110. In another example, a finer level of granularity can be achieved by associating different campaign IDs with different advertisements that are displayed within the first user application 110 (or other user applications 110). In this manner, the advertisement network 102 can identify particular advertisements that engage users more effectively, and, in turn, fine-tune their advertising approaches. According to some embodiments, the campaign ID can be implemented as any known data type for storing a value, e.g., an integer, an alphanumeric character, and so on. For example, the campaign ID can take the form of a low ordinal integer. Additionally, and according to some embodiments, the UUID can serve as a value that uniquely identifies the advertisement package relative to other advertisement packages that are generated by the advertisement network 102. For example, the UUID can be produced using random generators, incrementable/decrementable starting values, and so on, and take the form of an integer, an alphanumeric character, and so on. According to some embodiments, and as described in greater detail below, the advertisement network 102 can retain a history of the different UUIDs that are generated for prior advertisement packages to ensure that the UUID is globally unique.

Additionally, and as shown in FIG. 2B, step 216 can involve the advertisement network 102 digitally signing each of the advertisement network ID, the campaign ID, and the UUID using the advertisement network private key ($SK_{AN}$) counterpart to the advertisement network public key ($PK_{AN}$). As is well-understood, the advertisement network public key ($PK_{AN}$)—which is possessed by the advertisement metrics manager 104 by way of the registration process described above at step 204 in conjunction with FIG. 2A—can be utilized to verify that the digital signatures were, in fact, generated using the advertisement network private key ($SK_{AN}$), which presumably is only possessed by and accessible to the advertisement network 102. In this regard, the advertisement metrics manager 104 can reliably authenticate that the advertisement packages were, in fact, generated by the advertisement network 102, which is described below in greater detail in conjunction with FIG. 2C.

As shown in FIG. 2B, at step 218, the first user application 110 receives the advertisement package from the advertisement network 102, and displays the advertisement in accordance with the advertisement information included in the advertisement package. Continuing with the example described above in conjunction with step 216, step 218 can involve the first application displaying the screenshots/animations associated with the second user application 110, the name of the second user application 110, the price of the second user application 110, and so on. For example, the foregoing can be displayed in an advertisement banner, a pop-up, etc., that is overlaid onto a primary user interface of the first user application 110.

At step 220, the first user application 110—in response to receiving a selection of the ad—provides, to the app store application 108 via a URL associated with the app store application 108, the advertisement package parameters (2) and (3). According to some embodiments, step 220 can be triggered by a user interacting with the advertisement displayed by the first user application 110, e.g., selecting the advertisement by way of touch input, mouse input, keyboard input, voice input, and so on. It is noted that any known approach can be used to trigger the selection of the advertisement without departing from the scope of this disclosure. According to some embodiments, the application ID (associated with the second user application 110) can be included as a parameter within the URL associated with the app store application 108. For example, the URL can include a base address, e.g., "https://app.store.com/us?App_ID={ }&params={ }", where the application ID and the parameters (2) and (3) are inserted into the respective parameter fields of the foregoing example URL. In this regard, the URL, when launched within the computing device 106, can cause the app store application 108 to load and display an information page associated with the second user application 110. It is noted that the foregoing URL is merely exemplary, and that any form of a URL can be utilized without departing from the scope of this disclosure. Additionally, it is noted that other approaches can be utilized to supplement or eliminate the usage of URLs, e.g., opening (direct or indirect) communication links between the first user application 110 and the app store application 108, without departing from the scope of this disclosure.

At step 222, the app store application 108 receives and caches (i.e., stores) the advertisement package parameters (2) and (3). According to some embodiments, the app store application 108 can be configured to associate the advertisement package parameters (2) and (3) with an expiration time that, when satisfied, causes "stale" advertisement package parameters (2) and (3) to be removed from the cache. In this manner, the app store application 108 can implement a "cool-off" period that effectively protects the advertisement network 102 from unreasonably attributing installations of the second user application 110 to the first user application 110. For example, if a user initially selects the advertisement for the second user application 110 within the first user application 110, fails to install the second user application 110, and subsequently installs the second user application 110 (by their own volition) at a later time that exceeds the expiration time, then advertisement network 102 will not attribute the installation of the second user application 110 to the advertisement displayed in the first user application 110. In this manner, the overall integrity and accuracy of the advertisement attribution techniques set forth herein can be enhanced. It is noted that different expiration times can be applied in accordance with a variety of rules when caching advertisement package parameters, e.g., the types of user applications 110 associated with the advertisement package parameters, business agreements between the user applications 110 and the advertisement networks 102, and so on. For example, the advertisement package can include an expiration time (specified by the advertisement network 102) for caching the advertisement package that is to be enforced by the app store application 108 upon receipt of the advertisement package.

At step 224, the app store application 108 displays a product page for the second user application 110. For example, the product page can be displayed within a user interface associated with the app store application 108, and can include any information associated with the second user application 110, e.g., purchase options, installation options, add-on options, and so on. At step 226, the app store application 108 receives a request to install the second user application 110. This can involve, for example, a user selecting an option to download and install the second user application 110 as freeware, purchasing the second user application 110 on a fixed price or subscription price basis, and so on. In any case, at step 228, and in response to the request to install the second user application, the app store application 108 causes the second user application 110 to be installed on the computing device 106.

FIG. 2C depicts a third process—referred to herein as an "attribution process"—that can involve some form of activity associated with the second user application 110 taking place on the computing device 106 subsequent to the installation of the second user application 110 on the computing device 106. According to some embodiments, and as shown in FIG. 2C, at step 230, the second user application 110 detects that an activity associated with the second user application 110 satisfies at least one criterion. The at least one criterion can include, for example: the installation (itself) of the second user application 110 (e.g., at step 228 of FIG. 2B), the second user application 110 launching for a first time, the second user application 110 launching a threshold number of times, a user interacting with the second user application 110 for a threshold amount of time, the user performing at least one particular action within the second user application 110, and so on. It is noted that the foregoing examples are not meant to represent an exhaustive list, and that the criterion can encompass any activity associated with the operation of the computing device 106. Additionally, it is noted that it is not a requirement for the second user application 110 to self-detect the above-described criteria. On the contrary, one or more software applications executing on the computing device 106—for example, an OS-level daemon, the app store application 108 itself, etc.—can be configured to identify when the above-described at least one criterion is satisfied.

In any case, at step 232, the second user application 110 provides, to the app store application 108, the application ID (associated with the second user application 110). As described in greater detail below, the provision of this information effectively notifies the app store application 108 that some form of activity is occurring in association with the second user application 110. In this regard, assuming the expiration time associated with the advertisement package cached by the app store application 108 at step 222 of FIG. 2B has not been exceeded, the app store application 108 attributes the activity to the advertisement (for the second user application 110) that was displayed and selected within the first user application 110. Accordingly, at step 234, the app store application 108 looks up the cached advertisement package parameters (3) based on the application ID. In particular, the app store application 108 is able to perform this lookup as a result of carrying out step 222 described above in conjunction with FIG. 2B, where both the advertisement package parameters (2) (i.e., the application ID (associated with the second user application 110)) and (3) were cached by the app store application 108.

At step 236, the app store application 108 provides, to the advertisement metrics manager 104, the cached advertisement package parameters (3) and the application ID (associated with the second user application 110). In turn, at step 238, the advertisement metrics manager 104 extracts the advertisement network ID (associated with the advertisement network 102) included in the advertisement package parameters (3), and utilizes the advertisement network ID to lookup: the advertisement network public key ($PK_{AN}$), and the advertisement network URL. Notably, the advertisement metrics manager 104 is able to perform this lookup as a result of carrying out step 206 described above in conjunction with FIG. 2A, where both the advertisement network public key ($PK_{AN}$) and the advertisement network URL were cached by the advertisement metrics manager 104. At step 240, the advertisement metrics manager 104—using the advertisement network public key ($PK_{AN}$)—validates the digital signatures (established by the advertisement network 102 at step 216 of FIG. 2B) on (i) the advertisement network ID, (ii) the campaign ID, and (iii) the UUID (all included in the advertisement package parameters (3)). It is noted that this validation can help thwart malicious advertisement networks 102 that are attempting to pose as the advertisement network 102, which presumably do not have access to the advertisement network private key ($SK_{AN}$). At step 242, the advertisement metrics manager 104 validates the (3)(ii) campaign ID. This can involve, for example, the advertisement metrics manager 104 validating that the (3)(ii) campaign ID takes the form of a low ordinal integer (as previously described herein). Notably, this approach can enable the advertisement metrics manager 104 to verify that the campaign ID conforms to the campaign IDs typically generated by the advertisement network 102, thereby providing an additional layer of security against rogue entities that attempt to spoof the advertisement network 102. Additionally, step 242 can involve the ad metrics manager 104 validating the (3)(iii) UUID. This can involve, for example, the ad metrics manager 104 verifying that the (3)(iii) UUID was not previously utilized by a different advertisement package. In this manner, malicious "replay" schemes that otherwise might cause the advertisement metrics manager 104/advertisement network 102 to erroneously award advertisement attributions can be mitigated.

When the validations at steps 240/242 are completed, the advertisement metrics manager 104 provides, to the advertisement network 102, the necessary information to indicate to the advertisement network 102 that an advertisement attribution should be recognized. In particular, at step 244, the advertisement metrics manager 104 provides—to the advertisement network 102 via the advertisement network URL—the campaign ID, and the application ID. In this regard, and according to some embodiments, the advertisement network 102 can utilize the campaign ID to identify that the first user application 110 displayed the advertisement, and can further utilize the application ID to identify that the second user application 110 was installed/utilized as a result of the advertisement. In turn, at step 246, the advertisement network 102 can carry out business logic to reflect the installation of the second user application 110 in association with the advertisement displayed by the first user application 110. This can involve, for example, a first management entity associated with the first user application receiving payment from one or more of the advertisement network or a second management entity associated with the second user application. It is noted that the foregoing example is not meant to be limiting, and that any business logic can be carried out by the advertisement network 102 (or other entities) in response to the receipt of the information provided by the advertisement metrics manager 104 at step 244.

Figure 3A:
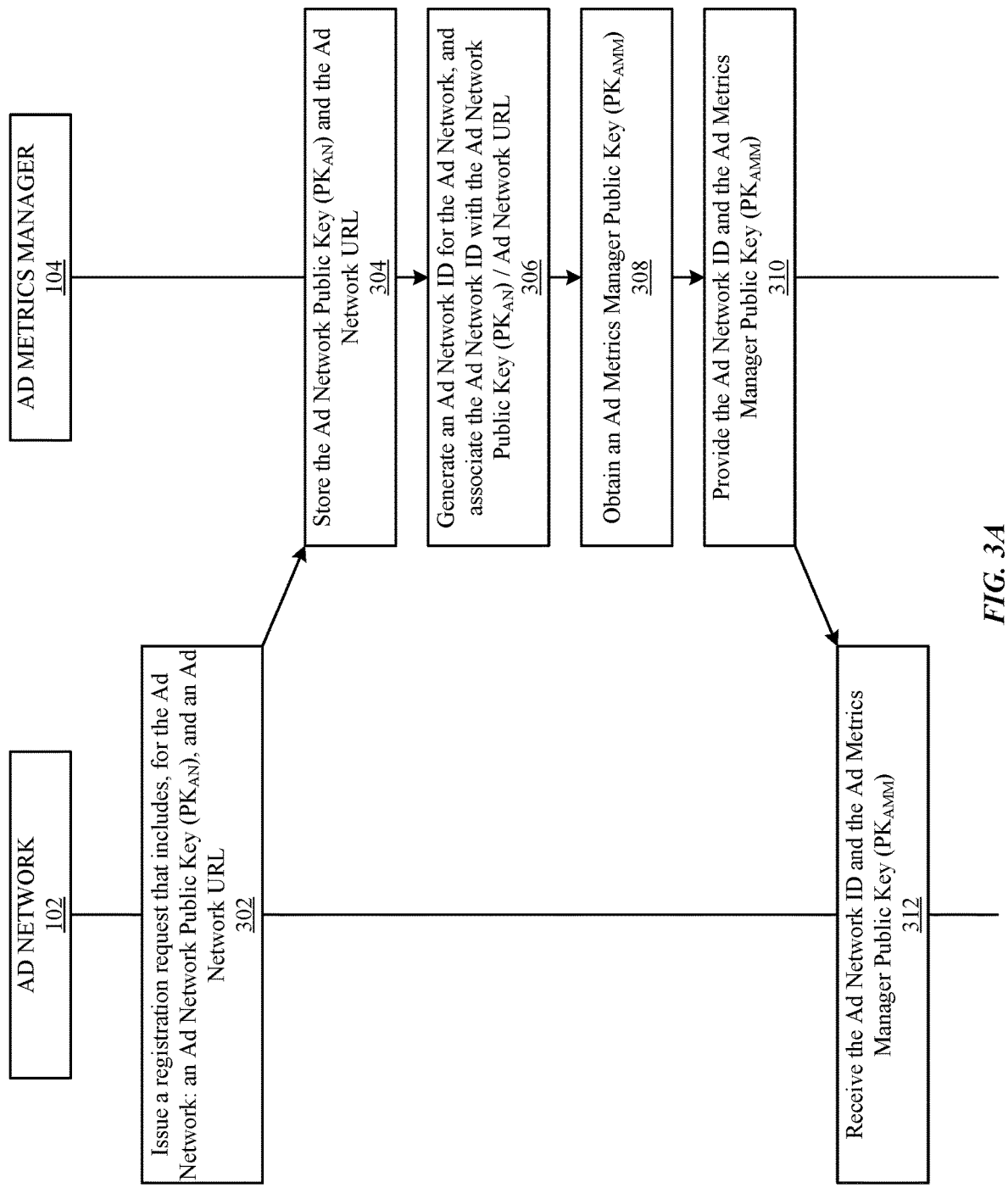
FIGS. 3A-3D illustrate a method for a second approach for implementing the advertisement attribution techniques set forth herein, according to some embodiments.

FIGS. 3A-3D illustrate a method for a second approach for implementing the advertisement attribution techniques set forth herein, according to some embodiments. In particular, FIG. 3A depicts a first process—referred to herein as a "registration process"—that can take place between the advertisement network 102 and the advertisement metrics manager 104 to permit the advertisement network 102 to participate in the second approach for implementing the advertisement attribution techniques. As shown in FIG. 3A, the registration process begins at step 302, where the advertisement network 102 issues—to the advertisement metrics manager 104—a registration request that includes, for the advertisement network 102: an advertisement network public key ($PK_{AN}$), and an advertisement network URL (e.g., as described above at step 202 in conjunction with FIG. 2A).

At step 304, the advertisement metrics manager 104 receives the registration request from the advertisement network 102, and, in turn, the advertisement metrics manager 104 stores the advertisement network public key ($PK_{AN}$) and the advertisement network URL within a storage that is accessible to the advertisement metrics manager 104 (e.g., as describe above at step 204 in conjunction with FIG. 2A). To satisfy the registration request, the advertisement metrics manager 104, at step 306, generates an advertisement network ID that is unique to the advertisement network 102, and associates the advertisement network ID with the advertisement network public key ($PK_{AN}$) and the advertisement network URL (e.g., as described above at step 206 in conjunction with FIG. 2A). At step 308, the advertisement metrics manager 104 obtains an advertisement metrics manager public key ($PK_{AMM}$). According to some embodiments, the advertisement metrics manager 104 can manage both the advertisement metrics manager public key ($PK_{AMM}$) and a counterpart advertisement metrics manager private key ($SK_{AMM}$) in accordance with asymmetrical cryptographic approaches, e.g., where the advertisement metrics manager public key ($PK_{AMM}$) is freely-distributable, but the advertisement metrics manager private key ($SK_{AMM}$) is to be retained only by the advertisement metrics manager 104. At step 310, the advertisement metrics manager 104 provides both (1) the advertisement network ID, and (2) the advertisement metrics manager public key ($PK_{AMM}$) back to the advertisement network 102. In turn, at step 312, the advertisement network 102 receives and stores both (1) the advertisement network ID, and (2) the advertisement metrics manager public key ($PK_{AMM}$). Thus, at the conclusion of FIG. 3A, the advertisement network 102 has completed the registration process with the advertisement metrics manager 104, and is now capable of participating in the second approach for implementing the advertisement attribution techniques set forth herein.

Figure 3B:
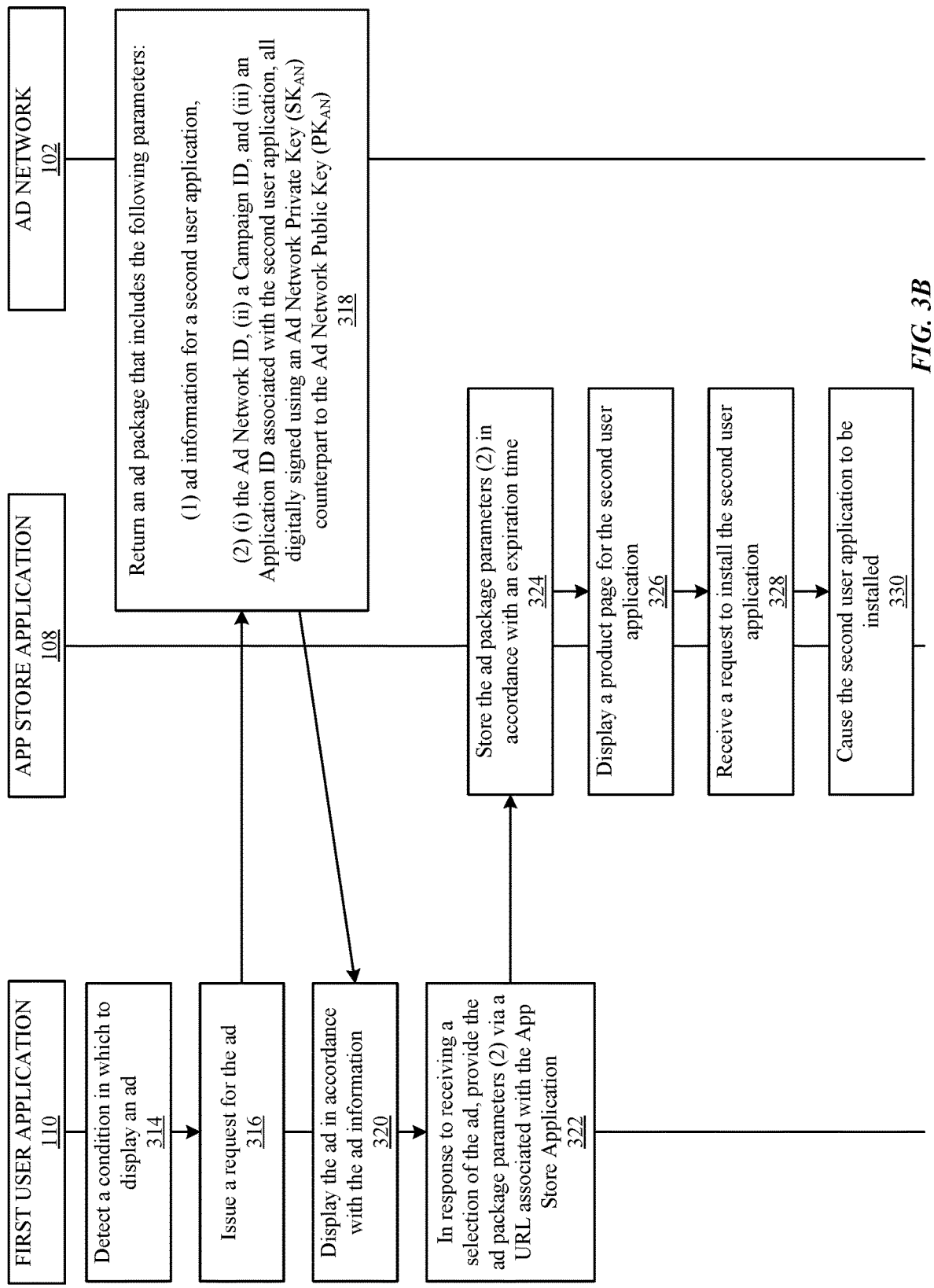
Figure 3C:
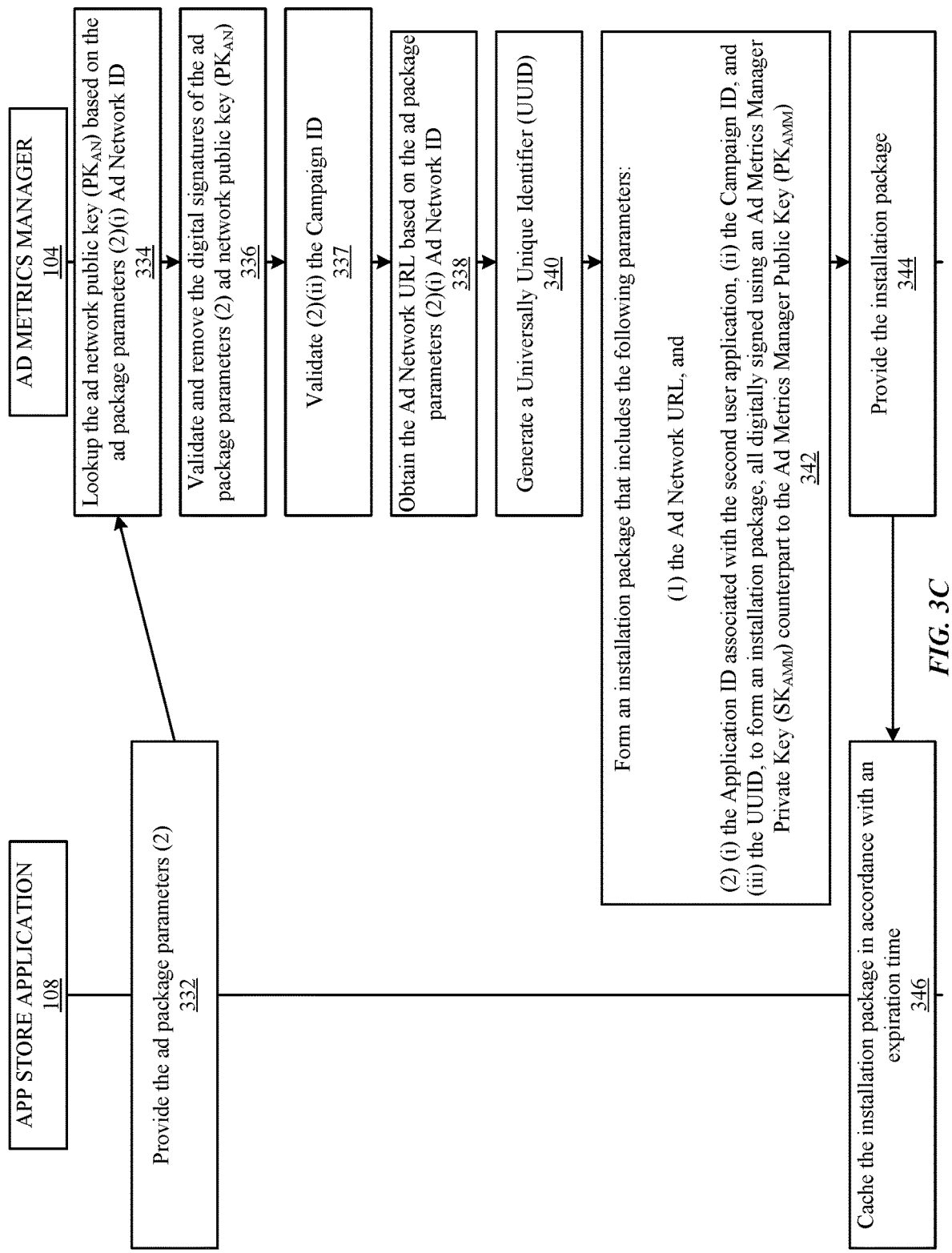

FIGS. 3B-3C depict a second process—referred to herein as an "installation process"—that can take place as a result of displaying, within user applications 110, advertisements that are provided by the advertisement network 102, according to some embodiments. As shown in FIG. 3B, at step 314, a first user application 110 executing the computing device 106 detects a condition in which to display an advertisement (e.g., as described above at step 212 in conjunction with FIG. 2B). At step 316, the first user application 110 issues, to the advertisement network 102, a request for the advertisement (e.g., as described above at step 214 in conjunction with FIG. 2B).

In turn, at step 318, the advertisement network 102 returns, to the first user application 110, an advertisement package that includes (1) advertisement information for a second user application 110 (that is distinct from the first user application 110) (e.g., as described above at step 216 in conjunction with FIG. 2B). As shown in FIG. 3B, the advertisement package can include (2) (i) the advertisement network ID, (ii) a campaign ID, and (iii) an application ID associated with the second user application 110 (e.g., as also described above at step 216 in conjunction with FIG. 2B). As also shown in FIG. 3B, step 318 can involve the advertisement network 102 digitally signing each of the advertisement network ID, the campaign ID, and the application ID associated with the second user application 110, using the advertisement network private key ($SK_{AN}$) counterpart to the advertisement network public key ($PK_{AN}$) (e.g., as also described above at step 216 in conjunction with FIG. 2B). At the conclusion of step 318, the advertisement network 102 provides, to the first user application 110, the advertisement package established at step 318.

At step 320, the first user application 110 receives the advertisement package from the advertisement network 102, and displays the advertisement in accordance with the advertisement information included in the advertisement package (e.g., as described above at step 218 in conjunction with FIG. 2B). At step 322, the first user application 110—in response to receiving a selection of the ad—provides the advertisement package parameters (2) to the app store application 108 via a URL associated with the app store application 108 (e.g., as described above at step 220 in conjunction with FIG. 2B).

At step 324, the app store application 108 caches (i.e., stores) the advertisement package parameters (2) in accordance with an expiration time (e.g., as described above at step 222 in conjunction with FIG. 2B). At step 326, the app store application 108 displays a product page for the second user application 110 (e.g., as described above at step 224 in conjunction with FIG. 2B). At step 328, the app store application 108 receives a request to install the second user application 110 (e.g., as described above at step 226 in conjunction with FIG. 2B). At step 330, the app store application 108 causes the second user application 110 to be installed on the computing device 106 (e.g., as described above at step 228 in conjunction with FIG. 2B).

Turning now to FIG. 3C, at step 332, the app store application 108 provides, to the advertisement metrics manager 104, the advertisement package parameters (2). At step 334, the app store application 108 looks up the advertisement network public key ($PK_{AN}$) based on the advertisement package parameters (2)(i) advertisement network ID. In turn, at step 336, the advertisement metrics manager 104 validates and removes the digital signatures of the advertisement package parameters (2)—in particular, the (i) advertisement network ID, (ii) campaign ID, and (iii) application ID—using the advertisement network public key ($PK_{AN}$) (e.g., as described above at step 240 in conjunction with FIG. 2C).

At step 337, the app store application 108 confirms that the advertisement package parameters (2)(ii) campaign ID is valid. According to some embodiments, confirming the validity of the (2)(ii) campaign ID can involve verifying that the campaign ID is in an expected form (e.g., a low ordinal integer, as described herein). At step 338, the advertisement metrics manager 104 obtains the advertisement network URL based on the i) advertisement network ID included in the advertisement package parameters (2). At step 340, the advertisement metrics manager 104 generates a UUID (e.g., as described above at step 216 in conjunction with FIG. 2B). At step 342, the advertisement metrics manager 104 forms an installation package that includes the following parameters: (1) the advertisement network URL, and (2) (i) the application ID associated with the second user application, (ii) the campaign ID, and (iii) the UUID, to form an installation package, where all of the parameters (2) are all digitally signed using an advertisement metrics manager private key ($SK_{AMM}$) counterpart to the advertisement metrics manager public key ($PK_{AMM}$). At step 344, the advertisement metrics manager 104 provides the installation package to the app store application 108. In turn, at step 346, the app store application 108 caches the installation package in accordance with an expiration time (e.g., as described above at step 222 in conjunction with FIG. 2B).

Figure 3D:
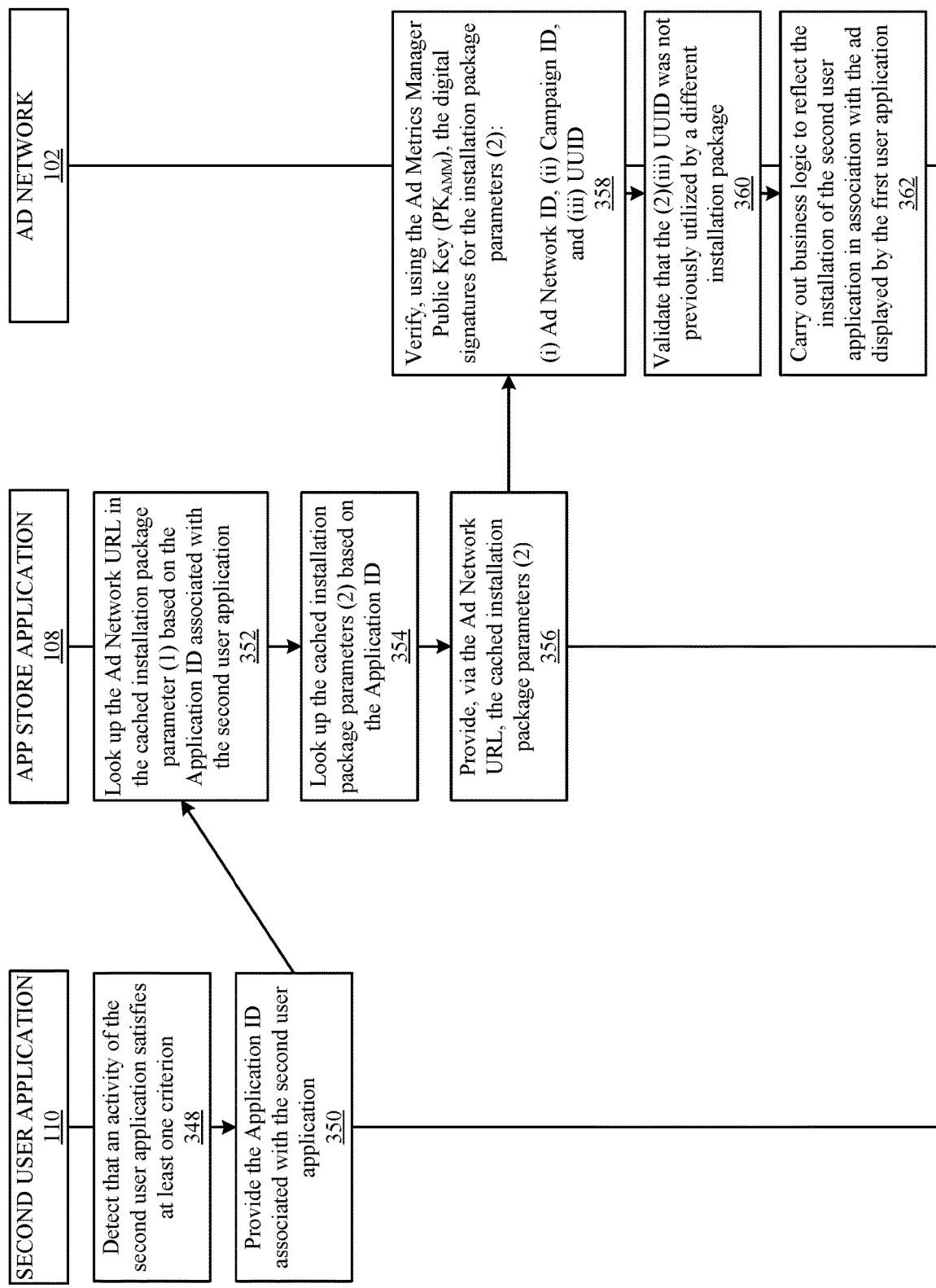

FIG. 3D depicts a third process—referred to herein as an "attribution process"—that can involve some form of activity associated with the second user application 110 taking place on the computing device 106 subsequent to the installation of the second user application 110 on the computing device 106. According to some embodiments, and as shown in FIG. 3D, at step 348, the second user application 110 detects that an activity of the second user application 110 satisfies at least one criterion (e.g., as described above at step 230 in conjunction with FIG. 2C). At step 350, the second user application 110 provides, to the app store application 108, the application ID associated with the second user application 110 (e.g., as described above at step 232 in conjunction with FIG. 2C). At step 352, the app store application 108 looks up the advertisement network URL in the cached installation package parameter (1) based on the application ID associated with the second user application 110—and, at step 354, the app store application 108 looks up the cached installation package parameters (2) based on the application ID (e.g., as described above at step 234 in conjunction with FIG. 2C). At step 356, the app store application 108 provides to the advertisement network 102 via the advertisement network URL, the cached installation package parameters (2).

At step 358, the advertisement network 102 verifies, using the advertisement metrics manager public key ($PK_{AMM}$) (received by the advertisement network 102 at step 312 of FIG. 3A), the digital signatures for the installation package parameters (2) (i) advertisement network ID, (ii) campaign ID, and (iii) UUID (e.g., as described above at step 240 in conjunction with FIG. 2C). At step 360, the advertisement network 102 validates that the (2)(iii) UUID was not previously utilized by a different installation package (e.g., as described above at step 242 in conjunction with FIG. 2C). Finally, at step 362, the advertisement network 102 carries out business logic to reflect the installation of the second user application 110 in association with the advertisement displayed by the first user application 110.

Figure 4:
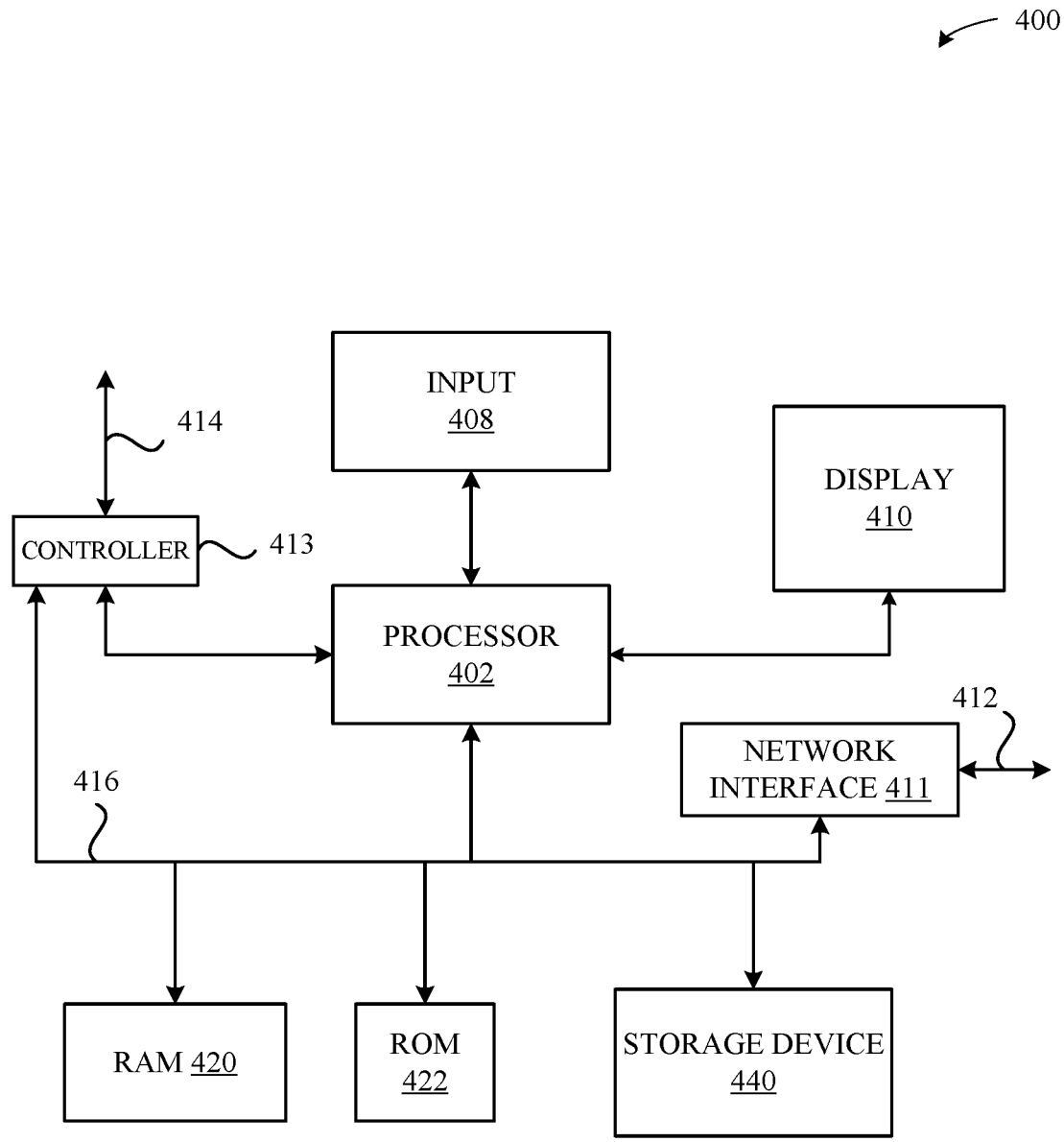
FIG. 4 illustrates a detailed view of a computing device that can be used to implement the various techniques described herein, according to some embodiments.

FIG. 4 illustrates a detailed view of a computing device 400 that can be used to implement the various techniques described herein, according to some embodiments. In particular, the detailed view illustrates various components that can be included in any of the advertisement network 102, the advertisement metrics manager 104, and the computing device 106 described above in conjunction with FIG. 1. As shown in FIG. 4, the computing device 400 can include a processor 402 that represents a microprocessor or controller for controlling the overall operation of the computing device 400. The computing device 400 can also include a user input device 408 that allows a user of the computing device 400 to interact with the computing device 400. For example, the user input device 408 can take a variety of forms, such as a button, keypad, dial, touch screen, audio input interface, visual/image capture input interface, input in the form of sensor data, and so on. Still further, the computing device 400 can include a display 410 that can be controlled by the processor 402 (e.g., via a graphics component) to display information to the user. A data bus 416 can facilitate data transfer between at least a storage device 440, the processor 402, and a controller 413. The controller 413 can be used to interface with and control different equipment through an equipment control bus 414. The computing device 400 can also include a network/bus interface 411 that couples to a data link 412. In the case of a wireless connection, the network/bus interface 411 can include a wireless transceiver.

As noted above, the computing device 400 also includes the storage device 440, which can comprise a single disk or a collection of disks (e.g., hard drives). In some embodiments, storage device 440 can include flash memory, semiconductor (solid-state) memory or the like. The computing device 400 can also include a Random-Access Memory (RAM) 420 and a Read-Only Memory (ROM) 422. The ROM 422 can store programs, utilities or processes to be executed in a non-volatile manner. The RAM 420 can provide volatile data storage, and stores instructions related to the operation of applications executing on the computing device 400.

As described above, one aspect of the present technology is the gathering and use of data available from various sources to improve the delivery to users of invitational content or any other content that may be of interest to them. The present disclosure contemplates that in some instances, this gathered data may include personal information data that uniquely identifies or can be used to contact or locate a specific person. Such personal information data can include demographic data, location-based data, telephone numbers, email addresses, twitter ID's, home addresses, data or records relating to a user's health or level of fitness (e.g., vital signs measurements, medication information, exercise information), date of birth, or any other identifying or personal information.

The present disclosure recognizes that the use of such personal information data, in the present technology, can be used to the benefit of users. For example, the personal information data can be used to deliver targeted content that is of greater interest to the user. Accordingly, use of such personal information data enables users to calculated control of the delivered content. Further, other uses for personal information data that benefit the user are also contemplated by the present disclosure. For instance, health and fitness data may be used to provide insights into a user's general wellness, or may be used as positive feedback to individuals using technology to pursue wellness goals.

The present disclosure contemplates that the entities responsible for the collection, analysis, disclosure, transfer, storage, or other use of such personal information data will comply with well-established privacy policies and/or privacy practices. In particular, such entities should implement and consistently use privacy policies and practices that are generally recognized as meeting or exceeding industry or governmental requirements for maintaining personal information data private and secure. Such policies should be easily accessible by users, and should be updated as the collection and/or use of data changes. Personal information from users should be collected for legitimate and reasonable uses of the entity and not shared or sold outside of those legitimate uses. Further, such collection/sharing should occur after receiving the informed consent of the users. Additionally, such entities should consider taking any needed steps for safeguarding and securing access to such personal information data and ensuring that others with access to the personal information data adhere to their privacy policies and procedures. Further, such entities can subject themselves to evaluation by third parties to certify their adherence to widely accepted privacy policies and practices. In addition, policies and practices should be adapted for the particular types of personal information data being collected and/or accessed and adapted to applicable laws and standards, including jurisdiction-specific considerations. For instance, in the US, collection of or access to certain health data may be governed by federal and/or state laws, such as the Health Insurance Portability and Accountability Act (HIPAA); whereas health data in other countries may be subject to other regulations and policies and should be handled accordingly. Hence different privacy practices should be maintained for different personal data types in each country.

Despite the foregoing, the present disclosure also contemplates embodiments in which users selectively block the use of, or access to, personal information data. That is, the present disclosure contemplates that hardware and/or software elements can be provided to prevent or block access to such personal information data. For example, in the case of advertisement delivery services, the present technology can be configured to allow users to select to "opt in" or "opt out" of participation in the collection of personal information data during registration for services or anytime thereafter. In addition to providing "opt in" and "opt out" options, the present disclosure contemplates providing notifications relating to the access or use of personal information. For instance, a user may be notified upon downloading an app that their personal information data will be accessed and then reminded again just before personal information data is accessed by the app.

Moreover, it is the intent of the present disclosure that personal information data should be managed and handled in a way to minimize risks of unintentional or unauthorized access or use. Risk can be minimized by limiting the collection of data and deleting data once it is no longer needed. In addition, and when applicable, including in certain health related applications, data de-identification can be used to protect a user's privacy. De-identification may be facilitated, when appropriate, by removing specific identifiers (e.g., date of birth, etc.), controlling the amount or specificity of data stored (e.g., collecting location data a city level rather than at an address level), controlling how data is stored (e.g., aggregating data across users), and/or other methods.

Therefore, although the present disclosure broadly covers use of personal information data to implement one or more various disclosed embodiments, the present disclosure also contemplates that the various embodiments can also be implemented without the need for accessing such personal information data. That is, the various embodiments of the present technology are not rendered inoperable due to the lack of all or a portion of such personal information data. For example, content can be selected and delivered to users by inferring preferences based on non-personal information data or a bare minimum amount of personal information, such as the content being requested by the device associated with a user, other non-personal information available to the content delivery services, or publicly available information.

The various aspects, embodiments, implementations or features of the described embodiments can be used separately or in any combination. Various aspects of the described embodiments can be implemented by software, hardware or a combination of hardware and software. The described embodiments can also be embodied as computer readable code on a computer readable medium. The computer readable medium is any data storage device that can store data which can thereafter be read by a computer system. Examples of the computer readable medium include read-only memory, random-access memory, CD-ROMs, DVDs, magnetic tape, hard disk drives, solid-state drives, and optical data storage devices. The computer readable medium can also be distributed over network-coupled computer systems so that the computer readable code is stored and executed in a distributed fashion.

The foregoing description, for purposes of explanation, used specific nomenclature to provide a thorough understanding of the described embodiments. However, it will be apparent to one skilled in the art that the specific details are not required in order to practice the described embodiments. Thus, the foregoing descriptions of specific embodiments are presented for purposes of illustration and description. They are not intended to be exhaustive or to limit the described embodiments to the precise forms disclosed. It will be apparent to one of ordinary skill in the art that many modifications and variations are possible in view of the above teachings.

What is claimed is:

1. A method for managing advertisement attributions associated with software applications, the method comprising:
by an app store application executing on a first computing device:
receiving, from a first application executing on the first computing device, a request to access information associated with a second application managed by the app store application, wherein:
(i) the request includes a set of parameters that is provided by an advertisement network associated with the first application,
(ii) the set of parameters corresponds to an advertising campaign for the second application that is presented by the first application, and specifies at least one activity that, when performed in association with the second application, satisfies at least one criterion of the advertising campaign;
receiving, from the second application, an indication that activity associated with the second application has been performed;
determining, based on the indication, that the at least one criterion is satisfied; and
providing, to an advertisement metrics manager executing on a second computing device, the indication and the set of parameters; and
by the advertisement metrics manager executing on the second computing device:
determining, based on the indication and the set of parameters, that an advertisement attribution should be processed;
establishing a connection with the advertisement network; and
transmitting at least a portion of the set of parameters to the advertisement network to cause the advertisement network to carry out at least one action.

2. The method of claim 1, wherein the set of parameters includes:
(i) an advertisement network identifier (ID) associated with the advertisement network,
(ii) a campaign ID that identifies a type of the advertising campaign, and
(iii) a universally unique identifier (UUID) that is unique to the set of parameters relative to other sets of parameters generated by the advertisement network.

3. The method of claim 2, wherein a private key associated with the advertisement network is used to digitally-sign (i) the advertisement network ID, (ii) the UUID, and (iii) the campaign ID.

4. The method of claim 3, wherein the advertisement metrics manager verifies the set of parameters using a public key counterpart to the private key.

5. The method of claim 4, wherein verifying the set of parameters includes identifying that the campaign ID has not been previously verified within a different set of parameters.

6. The method of claim 1, further comprising, by the app store application executing on the first computing device:
prior to receiving the indication:
storing the set of parameters into a cache of the first computing device, wherein the cache stores a plurality of sets of parameters, and each set of parameters in the plurality of sets of parameters corresponds to a respective advertising campaign; and
removing the set of parameters from the cache in response to:
(i) providing the set of parameters to the advertisement metrics manager, or
(ii) identifying that the set of parameters has been stored in the cache for a threshold amount of time.

7. The method of claim 1, further comprising, by the app store application executing on the first computing device:
prior to receiving the indication:
receiving a second request to install the second application on the first computing device; and
causing the second application to be installed on the first computing device.

8. The method of claim 7, wherein the at least one criterion includes:
an installation of the second application on the first computing device,
the second application launching for a first time,
the second application launching a threshold number of times,
a user interacting with the second application for a threshold amount of time, and the user performing at least one particular action within the second application.

9. The method of claim 1, wherein the at least one action comprises a first management entity associated with the first application receiving payment from one or more of the advertisement network or a second management entity associated with the second application.

10. A system, comprising:
a first computing device that executes an app store application configured to carry out steps that include:
receiving, from a first application executing on the first computing device, a request to access information associated with a second application managed by the app store application, wherein:
(i) the request includes a set of parameters that is provided by an advertisement network associated with the first application,
(ii) the set of parameters corresponds to an advertising campaign for the second application that is presented by the first application, and specifies at least one activity that, when performed in association with the second application, satisfies at least one criterion of the advertising campaign;
receiving, from the second application, an indication that activity associated with the second application has been performed;
determining, based on the indication, that the at least one criterion is satisfied; and
providing, to an advertisement metrics manager executing on a second computing device, the indication and the set of parameters; and
the second computing device, wherein the advertisement metrics manager executing on the second computing device is configured to carry out steps that include:
determining, based on the indication and the set of parameters, that an advertisement attribution should be processed;
establishing a connection with the advertisement network; and
transmitting at least a portion of the set of parameters to the advertisement network to cause the advertisement network to carry out at least one action.

11. The system of claim 10, wherein the app store application executing on the first computing device is further configured to carry out steps that include:
prior to receiving the indication:
storing the set of parameters into a cache of the first computing device, wherein the cache stores a plurality of sets of parameters, and each set of parameters in the plurality of sets of parameters corresponds to a respective advertising campaign; and
remove the set of parameters from the cache in response to:
(i) providing the set of parameters to the advertisement metrics manager, or
(ii) identifying that the set of parameters has been stored in the cache for a threshold amount of time.

12. The system of claim 10, wherein the app store application executing on the first computing device is further configured to carry out steps that include:
prior to receiving the indication:
receiving a second request to install the second application on the first computing device; and
causing the second application to be installed on the first computing device.

13. The system of claim 10, wherein the at least one criterion includes:

an installation of the second application on the first computing device,
the second application launching for a first time,
the second application launching a threshold number of times,
a user interacting with the second application for a threshold amount of time, and
the user performing at least one particular action within the second application.

14. At least one non-transitory computer readable storage medium storing instructions that, when executed by first and second computing devices, cause:
the first computing device to execute an app store application configured to carry out steps that include:
receiving, from a first application executing on the first computing device, a request to access information associated with a second application managed by the app store application, wherein:
(i) the request includes a set of parameters that is provided by an advertisement network associated with the first application,
(ii) the set of parameters corresponds to an advertising campaign for the second application that is presented by the first application, and specifies at least one activity that, when performed in association with the second application, satisfies at least one criterion of the advertising campaign;
receiving, from the second application, an indication that activity associated with the second application has been performed;
determining, based on the indication, that the at least one criterion is satisfied; and
providing, to an advertisement metrics manager executing on the second computing device, the indication and the set of parameters; and
the advertisement metrics manager executing on the second computing device to carry out steps that include:
determining, based on the indication and the set of parameters, that an advertisement attribution should be processed;
establishing a connection with the advertisement network; and
transmitting at least a portion of the set of parameters to the advertisement network to cause the advertisement network to carry out at least one action.

15. The at least one non-transitory computer readable storage medium of claim 14, wherein the set of parameters includes:
(i) an advertisement network identifier (ID) associated with the advertisement network,
(ii) a campaign ID that identifies a type of the advertising campaign, and
(iii) a universally unique identifier (UUID) that is unique to the set of parameters relative to other sets of parameters generated by the advertisement network.

16. The at least one non-transitory computer readable storage medium of claim 15, wherein a private key associated with the advertisement network is used to digitally-sign (i) the advertisement network ID, (ii) the UUID, and (iii) the campaign ID.

17. The at least one non-transitory computer readable storage medium of claim 16, wherein the advertisement metrics manager verifies the set of parameters using a public key counterpart to the private key.

18. The at least one non-transitory computer readable storage medium of claim 17, wherein verifying the set of parameters includes identifying that the campaign ID has not been previously verified within a different set of parameters.

19. The at least one non-transitory computer readable storage medium of claim 14, wherein the app store application executing on the first computing device is further configured to carry out steps that include:
   prior to receiving the indication:
      storing the set of parameters into a cache of the first computing device, wherein the cache stores a plurality of sets of parameters, and each set of parameters in the plurality of sets of parameters corresponds to a respective advertising campaign; and
   removing the set of parameters from the cache in response to:
      (i) providing the set of parameters to the advertisement metrics manager, or
      (ii) identifying that the set of parameters has been stored in the cache for a threshold amount of time.

20. The at least one non-transitory computer readable storage medium of claim 14, wherein the app store application executing on the first computing device is further configured to carry out steps that include:
   prior to receiving the indication:
      receiving a second request to install the second application on the first computing device; and
      causing the second application to be installed on the first computing device.

\* \* \* \* \*